C. B. PETTENGILL.
Sad-Iron Holders and Lid-Lifters.

No. 139,733. Patented June 10, 1873.

Witnesses:
Frank H. Jordan
Arthur Noble

Inventor:
Charles B. Pettengill
Per atty.
William Henry Clifford

UNITED STATES PATENT OFFICE.

CHARLES B. PETTENGILL, OF HEBRON, MAINE.

IMPROVEMENT IN SAD-IRON HOLDERS AND LID-LIFTERS.

Specification forming part of Letters Patent No. 139,733, dated June 10, 1873; application filed May 23, 1873.

*To all whom it may concern:*

Be it known that I, CHARLES B. PETTENGILL, of Hebron, in the county of Oxford and State of Maine, have invented certain new and useful Improvements in Kitchen Implements; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
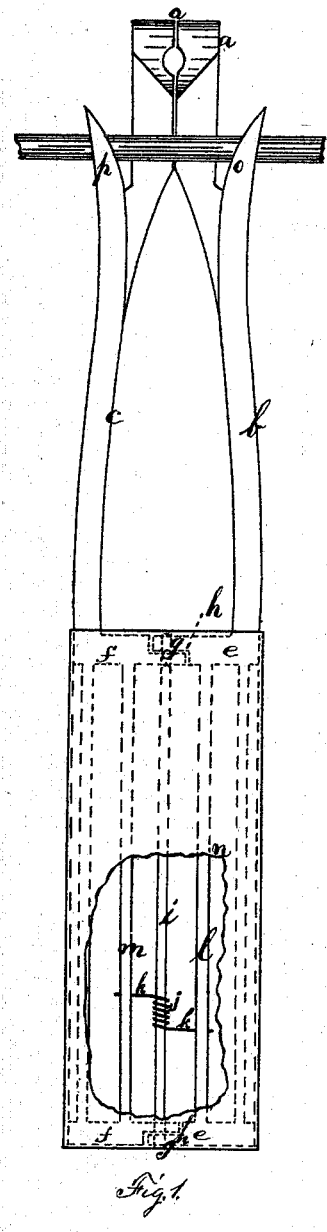
Figure 2:
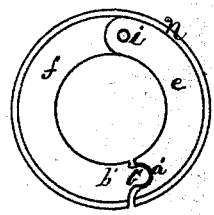

Figure 1 is a top-plan view of my invention, part being broken out to show the spring for operating the handle, and to illustrate the general construction and operation of the same. Fig. 2 is an end view.

Same letters show like parts.

The object of my invention is to produce an improved kitchen implement to be used as a sad-iron holder, pie-fork; for lifting basins, bowls, and kettles; for shifting dampers, grates in stoves, lifting covers, &c.

In the drawing, Fig. 1 shows a top-plan view with the jaws closed. At $a$ is seen the cover-lifter. It will be observed that this is of the form or shape that will fit the aperture or recess usually found in the covers of stoves, and that the same can easily be removed by the use of this instrument. The arms $b\ c$, the ends of which form the cover-lifter $a$, before described, extend backward and have cast to them the frames $e\ f$, indicated by dotted lines in Fig. 1. These frames are constructed as shown—that is to say, one of the frames, $e$, is provided with a lip or projection, $g$, on each outer end, and has also a shoulder, $h$, at each end. The other is provided with the same arrangement to close in by $e$. Longitudinally through these lips or projections are holes through which passes the rod $i$. Said rod, after passing through, being riveted or otherwise fastened at its outer ends, securely holds the frames together.

The form or shape of frames is shown in the end view, Fig. 2.

On the rod $i$, which holds together the frames $b\ c$, is seen attached a small spiral spring, $j$. This spring is loosely wound around the rod $i$, so as to be allowed to easily move backward and forward upon said rod. This spiral spring is provided with projecting arms $k$. These arms bear against the under side of the pieces $l\ m$, part of the frames $e\ f$, and have for their purpose to keep the jaws open. The handle, when closed, forms the sad-iron holder; or, in other words, the handle of the device is closed around the handle of the sad-iron, and, when so closed, it will be apparent that the iron, even if heated to a high degree of temperature, can be handled with perfect safety.

It will be observed (see Fig. 1) that the frames $e\ f$ are composed of iron, or of any suitable metal, with pieces extending from one end to the other, as before described. It will also be observed that these frames are provided with a cloth or leather covering, $n$, shown in Figs. 1 and 2. The purpose of this covering is to protect the hand from the heat that would arise from the sad-iron when used as a sad-iron holder. It also gives a finished and neat appearance to the handle.

I will next proceed to describe the arrangement for lifting basins, bowls, kettles, &c.: At a short distance from the forward ends of the arms $b\ c$, and back of the cover-lifter $a$, will be seen two prongs, $o\ p$, projecting from said arms. It will readily be seen that if the device is opened, and any article that can be admitted—as, for instance, the edge of a plate, basin, or bowl, or the bail of a kettle—be inserted between the prongs $o\ p$, and the parts of the frames $b\ c$, just back of the cover-lifter $a$, and the handle is then closed or tightened, the prongs will have a tendency to bear down on the article inserted, and will thus hold it in a secure position. In Fig. 1 is shown the manner in which an article is held by the prongs.

It is evident that the uses of my invention may be varied, and will be found convenient for lifting almost anything that the jaws will take. It will be found also convenient for shifting grates in stoves, dampers, &c. The drawing shows the device when closed.

In each end of the sad-iron holder, as shown at $a'$, is a notch into which fits the part $b'$, as shown. For lifting tea-kettles and like heavy articles, this may be used to advantage by letting the bail of the kettle fit into these notches and then closing the handle, when the article thus placed will be held securely by the part $b'$ resting or bearing against it.

What I claim as my invention, and desire to secure by Letters Patent, is—

The combination of the arms $b$ $c$, frames $e$ $f$, rod $i$, prongs $o$ $p$, spiral spring $j$, and the leather or cloth covering $n$, substantially in the manner herein set forth.

In testimony that I claim the foregoing I have hereunto set my hand this 16th day of May, 1873.

CHARLES B. PETTENGILL.

Witnesses:
  GEORGE COBB,
  CLARA C. COBB.